April 28, 1953
P. LANDRUM
2,636,567
MOTORCYCLE FRAME, SPRING SUSPENSION, AND
SHOCK ABSORBING MECHANISM THEREFOR
Filed March 27, 1950
2 SHEETS—SHEET 1
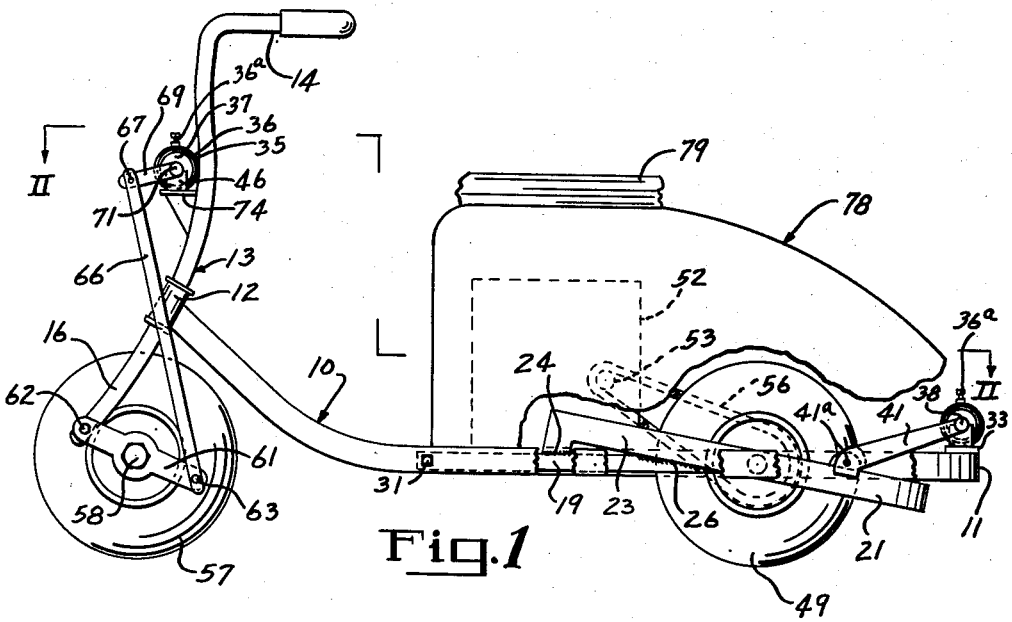
Fig.1
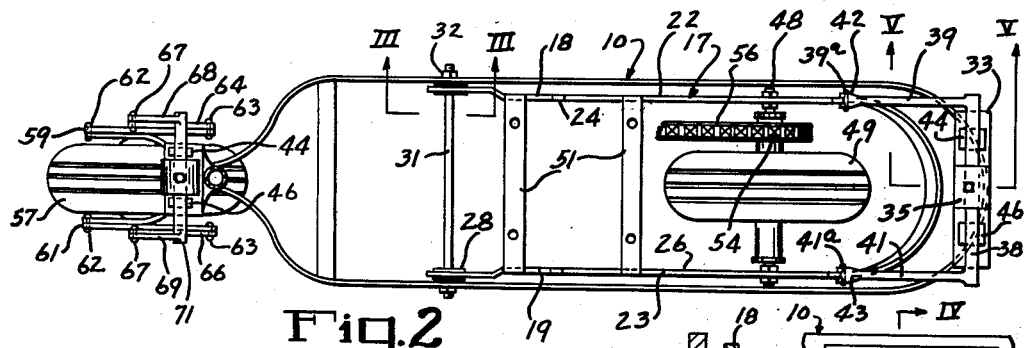
Fig.2
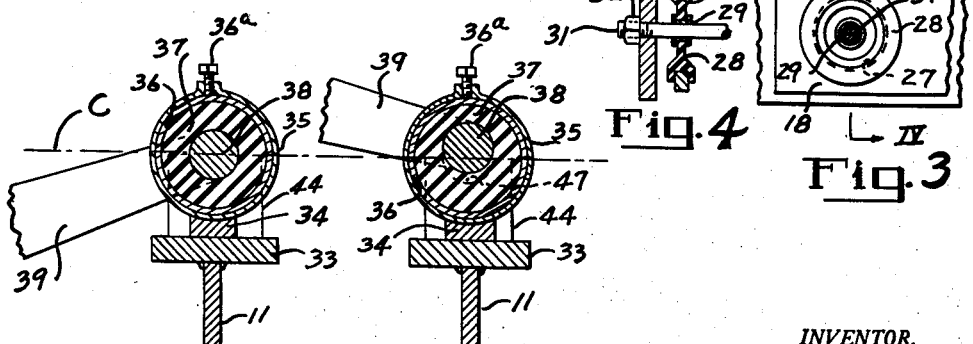
Fig.3   Fig.4   Fig.5   Fig.6
INVENTOR.
PORTER LANDRUM
BY
ATTORNEYS

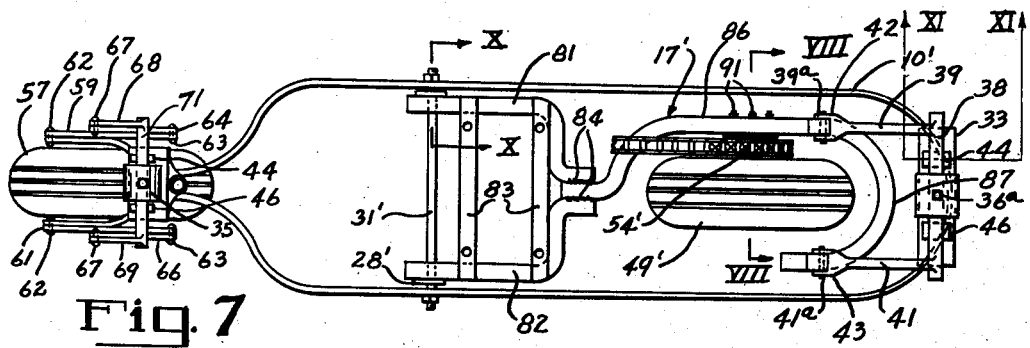
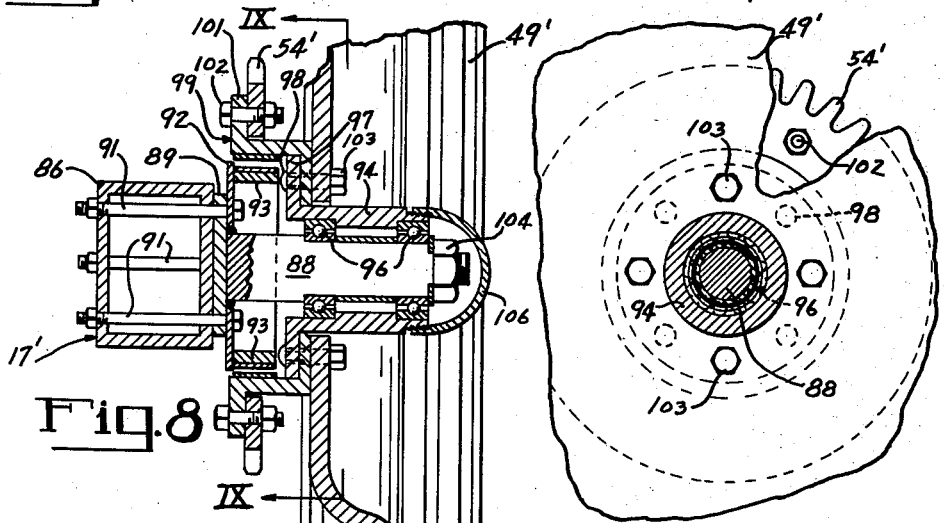
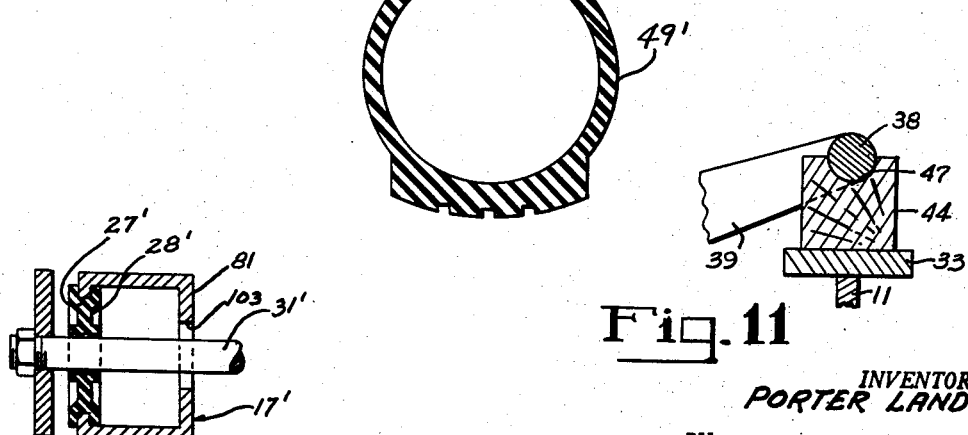

Patented Apr. 28, 1953

2,636,567

UNITED STATES PATENT OFFICE 2,636,567

MOTORCYCLE FRAME, SPRING SUSPENSION, AND SHOCK ABSORBING MECHANISM THEREFOR

Porter Landrum, Birmingham, Ala.

Application March 27, 1950, Serial No. 152,229

8 Claims. (Cl. 180—33)

My present invention relates to motorcycles and more particularly to an improved means for dampening and absorbing vibration of the engine and absorbing road shocks imposed on the wheels, whereby in a motorcycle constructed in accordance with my invention the transmission of such vibrations and shocks to the rider is reduced to the minimum, making the vehicle comfortable and safe to ride.

In one aspect my invention contemplates a motorcycle having a main frame for carrying the rider, and an auxiliary frame carrying the engine and rear driving wheel, the auxiliary frame being mounted adjacent its front end to the main frame by means of highly resilient, pieces of material such as rubber or the like, whereby the auxiliary frame is free to move through a limited range in any direction relative to the main frame, such construction affording means preventing the transmission to the main frame of the relatively high frequency and relatively low magnitude vibrations of the engine.

In another aspect, my invention contemplates a motorcycle embodying the foregoing features in which the rear of the auxiliary frame is resiliently sprung from the rear of the main frame through torsion type springs, preferably in the form of rubber blocks, with a through rod secured therein, and in which there are provided simple and efficient shock absorbing means which are automatically inoperable upon upward movement of the rear of the auxiliary frame, as for instance when the wheel strikes an elevation in the road, and which come automatically into operation after the rear end of the auxiliary frame has reached its high point of upward movement and commences to move downwardly, thus braking downward movement of the auxiliary frame relative to the main frame.

Another object is to provide a motorcycle embodying an outer or main frame which carries the weight of the rider together with the weight of certain parts of the machine, and an inner or auxiliary frame carrying the rear wheel and driving engine, the front end of the auxiliary frame being resiliently and pivotally mounted to the main frame, there being spring biased arms carried on the rear of the main frame and exerting a downward force on the rear end of the auxiliary frame, the parts being so constructed and arranged that the auxiliary frame is substantially balanced against rocking about the driving wheel, thereby obtaining the advantages to be hereinafter pointed out.

A further object is to provide a motorcycle embodying the foregoing features in which the front wheel is resiliently sprung from the main frame and which is also provided with my improved shock absorbing means, thus further reducing road shocks which would otherwise be transmitted to the rider.

Another object of my invention is to provide a motorcycle embodying the features above mentioned in which the auxiliary frame is constructed and arranged to permit the removal of the rear or driving wheel in a simple and expedious manner and particularly without disturbing the brake mechanism, chain, sprocket and the like.

A still further object is to provide a vehicle of the character designated which shall be simple of construction and trouble free in operation and in which the spring mountings and shock absorbers may be readily attached to existing motorcycles with minimum difficulty and with minimum changes in the existing structural portions of the machines.

A motorcycle illustrating the features of my invention is shown somewhat diagrammatically in the drawings forming a part of this application in which:

Fig. 1 is a somewhat diagrammatic side elevational view with certain parts of the frame and body broken away for the sake of clarity;

Fig. 2 is a sectional view taken generally along line II—II of Fig. 1 with the engine and body removed for the sake of clarity;

Fig. 3 is a detail sectional view taken generally along line III—III of Fig. 2 and drawn to an enlarged scale;

Fig. 4 is a detail sectional view taken generally along line IV—IV of Fig. 3;

Fig. 5 is a detail sectional view taken generally along line V—V of Fig. 2 and drawn to an enlarged scale;

Fig. 6 is a view corresponding to Fig. 5 and illustrating to an exaggerated extent the position of the spring and shock absorbing units when the load imposing member operatively connected thereto has moved in an upward direction relative to the main frame of the motorcycle;

Fig. 7 is a plan view of a modified form of frame structure corresponding generally to Fig. 2 of the drawings;

Fig. 8 is an enlarged detail sectional view taken generally along line VIII—VIII of Fig. 7, certain of the parts being broken away for the sake of clarity;

Fig. 9 is a detail fragmental sectional view taken generally along line IX—IX of Fig. 8;

Fig. 10 is an enlarged detail sectional view taken generally along line X—X of Fig. 7; and, Fig. 11 is an enlarged sectional view taken along the line XI—XI of Fig. 7.

Referring now to the drawings for a better understanding of my invention, my improved motorcycle embodies a main frame 10 which may conveniently be in the form of flat members turned edgewise, and joined at the rear by a curved piece 11. Adjacent the front the main frame 10 is provided with the usual bearing 12 within which is rotatably mounted a steering fork 13. The front fork comprises the upper or handle portion 14 and the lower or fork portion proper 16.

Mounted inside of the main frame 10 is my improved auxiliary or inner frame 17. The forward portion of the frame 17 comprises side members 18 and 19 which may be in the form of pieces of flat material turned on edge. The rear of the inner frame 17 may comprise a U-shaped piece of flat material 21 having the legs 22 and 23 thereof welded to the forward portions 18 and 19 along the lines 24 and 26, see Fig. 1. The inner frame 17 as a whole thus comprises a front portion having substantially horizontally disposed side members, namely the members 18 and 19, and a rear portion inclined relative to the front portion, namely the U-shaped portion 21. The importance of this construction will be more fully appreciated in connection with the torsion spring and shock absorbing means presently to be described.

The members 18 and 19, adjacent their forward ends are provided with circular openings 27. Disposed to fit in each of the openings 27 is a peripherally grooved rubber disc 28. The discs 28 are provided adjacent their center with metallic inserts 29. Passing through the inserts is a cross shaft 31 which is secured to the main frame 10 as by means of nuts 32 threaded onto the ends of the cross rod 31. As clearly shown in Fig. 4, the discs are relatively thin in transverse cross section whereby the forward end of the supplemental frame 17 is quite free to move generally within the limits of the elasticity of the rubber discs relative to the main frame 10. The importance of this feature likewise will be amplified as the description proceeds.

Mounted across the curved rear end of the main frame 10 to lie transversely thereof is a plate 33. Secured on a lug 34 carried by the plate 33 is a sleeve 35. Adjustably mounted for rotation in sleeve 35 is a tubular housing member 36 carrying the torsion type spring suspension means at the rear of the vehicle. The housing 36 may be held in angularly adjusted position relative to sleeve 35 by means of a set screw 36a. As illustrated in Figs. 5 and 6, and as is well understood in the art for such devices, a cylinder 37 of rubber or similar elastic material is vulcanized to the inner walls of the housing 36. Passing through the center of the cylinder of rubber and likewise secured thereto as by vulcanizing is a rod 38. The rod 38 overhangs the ends of the sleeve 35, housing 36 and the cylinder of rubber. Secured to the ends of the rod 38 are forwardly and downwardly directed arms 39 and 41. The arms 39 and 41 have yoke ends 42 and 43 thereon disposed to straddle the upper edge of the inner frame, near the rearmost end of the portion 21 thereof. The free ends of the arms 39 and 41 are pivotally connected as at 39a and 41a to suitable upstanding lugs or the like carried on the upper edges of the frame member 21.

Secured to the plate 33 beneath the overhanging ends of the rod 38 are blocks of friction material 44 and 46. The blocks 44 and 46 are provided with rounded seats 47 in which the rod normally engages with considerable downward pressure, but away from which seats the rod tends to move upon upward movement of the rear of the inner frame 17 in a manner later to be explained.

Mounted on an axle 48 carried by the inner frame 17 is a driving wheel 49. Mounted on suitable cross members 51 disposed adjacent the forward end of the inner frame is a driving engine indicated diagrammatically in Fig. 1 by the numeral 52. The driving engine carries a sprocket 53 on the power shaft thereof while the rear wheel carries a sprocket 54. A sprocket chain 56 passes over the sprockets for transmitting power from the engine to the rear wheel. In practice, certain controls on the order of clutches, brakes and the like may be provided, but they are omitted from the drawings since they form no part of the present invention. Suffice it to say that the driving engine as well as the driving wheel are carried by the auxiliary or inner frame 17.

A front wheel 57 is mounted on a suitable axle 58 carried between a pair of side arms 59 and 61. The forward ends of the arms 59 and 61 are pivoted to the respective ends of the fork 16 as at 62. Pivoted to the arms 59 and 61 as at 63 are upwardly and forwardly extending links 64 and 66. The upper ends of the links 64 and 66 are pivoted at 67 to the ends of forwardly and downwardly directed arms 68 and 69, functionally similar to the arms 39 and 41, and carried on the end of a rod 71, similar to the rod 38. The rod 71 passes through one of the rubber bushings 37 and is vulcanized thereto in the manner already explained with respect to the rod 38 in the bushing 37 at the rear of the vehicle. Also, the rubber bushing 37 is vulcanized to the inner walls of another of the housing members 36. Housing 36 is mounted for angular adjustment in a sleeve 35, as already explained. The sleeve 35 is suitably secured to a plate 74 carried on the upper part of the fork 13. Likewise, at each side of the overhanging rod 71 I provide the blocks 44 and 46 of friction material.

The vehicle may be provided with a shell type, rearwardly disposed body indicated generally by the numeral 78 on which is carried a rider's seat 79. The body 78 is wholly mounted on the outer frame 10 in any suitable manner, whereby the weight of the rider as well as the weight of the body and seat is transmitted initially to the outer frame 10.

Referring now more particularly to Figs. 7 to 10, inclusive. I show a somewhat modified form of my invention in which the auxiliary frame 17' is constructed and arranged to permit the ready removal of the rear wheel and tire for the purpose of changing the same or otherwise. As shown, the frame 17' may embody a forward section comprising members 81 and 82 cross braced by suitable members 83. The driving engine 52 for the motorcycle is disposed to be mounted on the members 83. The frame members 81 are bent around and may be welded as at 84 to the forward end of a continuous frame member 86.

The frame member 86 embodies a curved rear section 87, corresponding in general to the U-shaped portion 21 of the auxiliary frame described previously. It will be noted however that the curved portion is unconnected on one side with the remainder of the rear portion of the auxiliary frame, leaving an open space between the end of the curved portion 87 at one side and the remainder of the auxiliary frame. This construction defines an auxiliary frame having an opening along a side adjacent its rear end which is of a size to permit the rear wheel to be removed therethrough.

As best shown in Fig. 8 the rear wheel 49' is mounted so that the same may be readily removed. The construction embodies a spindle 88 which may have a flange 89 secured by bolts 91 to the portion 86 of the frame 17'. The bolts 81 also serve to secure a guide plate 92 for a pair of brake shoes 93, in the manner well understood.

The hub 94 for supporting the wheel is mounted on anti-friction bearings 96 having their inner races mounted on the spindle 88, and the hub may carry an inner flange 97. Secured to the flange 97 by rivets 98 is a Z-shaped brake drum and sprocket supporting member 99. A sprocket 54' may be secured to the outer flange 101 of the member 99 by means of bolts 102.

The central portion of the wheel 49' may be removably secured to the flange 97 of the hub 94 and the adjacent flange of the member 99 by means of removable studs 103. The entire assembly is held onto the spindle by means of a nut 104, and a cap 106 may be employed to seal the outer end of the assembly.

As best shown in Figs. 7 and 8 the entire auxiliary frame 17' preferably is made of square tubing. This is done for the purposes of strength, for the reasons well appreciated. The front end of the auxiliary frame is resiliently supported on a cross rod 31' by means of a pair of the rubber discs 28', substantially identical with those previously described. The discs may be conveniently mounted in a circular opening 27' provided in one wall of the square tubing, and an opening 103 may be provided in the opposite wall in alignment with the rod 31' to permit the necessary play and freedom of movement of the auxiliary frame relative to the cross rod 31'.

In the manner previously described I mount the plate 33 together with the remainder of the shock absorbing mechanism already described on the rear end of the main frame 10'. The free forward ends of the arms 39 and 41 are pivoted to the curved rear frame section 87. Similarly, I equip the front end of the modification being described with the resilient mounting mechanism already described and comprising the various links, the cross rod 71 and the block of rubber forming the spring therefor.

From the foregoing the method of constructing my improved motorcycle together with the manner of its operation and the advantages thereof may now be more fully explained and understood. As is well known in the art to which this invention relates the vibrations of an internal combustion engine of the type used on motorcycles are relatively high in frequency although relatively low in magnitude. In actual practice I have discovered that it is not necessary to rigidly pivotally mount the forward end of an inner frame to the outer frame in order to suitably support the engine and to transmit the traction of the rear wheel to the vehicle as a whole. Through the use of the highly resilient rubber bushings or discs at the front end of the inner frame 17, together with the pivotal connection of the arms 39 and 41 to the auxiliary frame, I have found that I can adequately tie the entire structure together. At the same time I eliminate substantially all of the high frequency motor vibrations which would otherwise be transmitted from the engine to the main frame of the vehicle and thence to the rider. It will be noted that the engine, which represents the major portion of the direct weight on the auxiliary frame 17 is mounted well forward of the wheel but closely adjacent the bushings which resiliently secure the forward end of the inner frame to the outer frame. Therefore, the moment of the dead weight of the engine from the point of connection of the inner and outer frames is relatively small. However, this moment of inertia is relatively larger when considering pivotal movement of the auxiliary frame about the axle of the rear wheel.

I assemble the spring support and shock absorbing mechanism at the rear of the vehicle so that the arms 39 and 41 are under enough initial downward tension to hold the inner and outer frames in approximately the relative pivoted position shown in Fig. 1 of the drawings when the vehicle carries its normal rated rider load of around 200 pounds. When thus assembled the entire auxiliary frame is substantially in balance relative to pivotal movement about the axle of the rear wheel. It will be noted that by loosening the screw 36a and rotating the housing 36, the initial downward force of the torsion spring may be easily set, thus balancing the individual vehicle to the rider's weight. The forward end of the thus balanced auxiliary frame is quite capable of being connected to the main frame through the very resilient discs 28. The driving and braking forces of the driving wheel are adequately transmitted to the main frame through the arms 39 and 41 and the torsion spring. Likewise the arms 39 and 41, being rigidly connected through the rod 38, serve to stabilize the auxiliary frame and hold the driving wheel to rotation in a vertical plane.

The assembly of the rubber cylinder within the housing 36 and vulcanized thereto and to the rod 38 provides, as is well known, a very efficient torsion spring assembly. For this reason, I prefer this type of spring to a metallic spring, although the latter is comprehended within the scope of my invention.

It will be noted that the arms 39 and 41 slope downwardly relative to the rear portion 21 of the auxiliary frame 17. Further, I assemble the blocks of friction material 44 and 46 so that the rod 38 seats frictionally therein without unduly moving the rod eccentrically of the rubber cylinder 37 when the vehicle is at rest and fully loaded. It will be seen that when the rear end of the inner frame 17 moves upwardly relative to the outer frame 10, as when the rear wheel 49 engages an elevation in the roadway, there is a force tending to move the entire rod 38 directly upwardly away from the friction blocks 44 and 46 as illustrated in Fig. 6. Thus, when the wheel 49 strikes an elevation in the roadway the blocks 44 and 46 are inoperative to restrain rotation of the rod 38. However, as soon as the upward force is removed from the ends of the arms 39 and 41, the rubber in the spring flows back to its normal position and the rod 38 again frictionally engages the seats 47 of the blocks 44 and 46. The reverse rotation of rod 38 thus is resisted due to the friction between the same and the blocks.

The functioning of the friction blocks 44 and 46 may be understood more clearly by reference to Figs. 5 and 6. In Fig. 5 I show the rod 38 fully seated in the blocks of friction material and in Fig. 6 the same is illustrated in an exaggerated unseated condition. The condition shown in Fig. 6 arises when the upper ends of the arms 39 and 41 are moved upwardly. This results in a slight vertical movement of the entire rod in the rubber material 37 which is indicated for purposes of comparison in Figs. 5 and 6 by the common center line C, although as will be clearly understood, the amount of this movement is highly exaggerated in Fig. 6. Stated differently, when load is imposed on the outer ends of the arms 39 and 41, the rod 38 is slightly displaced upwardly into the rubber 37, thus materially reducing the friction between the rod and the blocks of friction material. Due to the fact that the arms 39 and 41 slope initially downwardly, it will be apparent that the vertical component of the force to aid in unseating the rod 38 from the blocks of friction material is increased. In practice, however, the friction between the rod and friction blocks will be decreased when the ends thereof move upwardly even if the arms 39 and 41 are initially horizontal, and having them slope initially downward is not essential.

The functioning described with respect to the rubber torsion spring and friction blocks is substantially duplicated at the front wheel of the motorcycle. When the front wheel 57 moves upwardly, links 64 and 66 move upwardly, rotating the rod 71 clockwise and also reducing friction between the same and the blocks of friction material. However, once the links commence to move downwardly, the rod 71 seats more firmly on the blocks of friction material and this action snubs the sudden return of the rubber 37 to its initial position, hence dampening sudden return movement.

In order that it may be clear as to what I mean by a resilient means for mounting the front end of the inner frame 17 or 17', the following is cited as an example:

In a light motorcycle, commonly called a motor scooter, in which the engine weighs approximately 70 pounds, and is mounted with its center of mass substantially 8½ inches from the center line of the rod 31 or 31', I have found that discs of rubber approximately 2½ inches in diameter and with a wall thickness of approximately $\frac{3}{16}$ inch between the inner and outer peripheries are entirely satisfactory. Also, I have found that the torsion springs are quite adequate if the rubber spring is 2¾ inches in diameter and 3 inches long, and if the rods 38 and 71 are 1½ inches in diameter. While any suitable material may be used for the friction blocks 44 and 46, I prefer to use hardwood such as oak. For reasons which will be apparent to those skilled in the art, the above figures will vary considerably depending upon the kind of rubber used in the discs 28 and for the springs 37, as well as moment arms and loads. The above is given merely as an example and is not to be construed as a limitation.

The functioning of the shock absorbing mechanism of the modification shown in Figs. 7 to 10, inclusive, is identical with that previously described. It will be apparent from a consideration of Figs. 7 to 10 that when it becomes necessary to remove the rear wheel 49', the same is easily accomplished by simply removing the studs 103. The entire wheel may then be slid off the end of the hub 94, and completely removed from the vehicle through the open side of the inner frame. The use of the rectangular type tubing for the auxiliary frame 17' permits me to employ the construction shown without sacrificing the requisite strength. It will be seen that upon upward movement of the frame 17' relative to the main frame 10' the cross rod 38 to which the arms 39 and 41 are secured rises slightly from the blocks of friction material 44 and 46, thus obtaining the advantages already pointed out.

From the foregoing it will be apparent that I have devised an improved motorcycle frame and suspension means therefor together with an improved and greatly simplified shock absorbing apparatus. In actual practice I have found that my invention is simple, feasible and practical in every way. Further, I can apply the same to a large majority of existing motorcycles, such for instance as motor scooters, without making any major change in the existing portions thereof. Thus, my invention lends itself admirably to sale and distribution in kit form so that it is applicable to existing as well as new motorcycles. When a person rides a motorcycle constructed in accordance with my invention none of the usual engine vibrations are felt, and the general improved riding qualities thus obtained are further amplified and aided by the rubber spring suspension and shock absorbing means herein described. Also, I find that a motorcycle made in accordance with my invention is just as stable on the road, if not more so than conventional motorcycles. While the rear driving wheel and engine are free to move relative to the main frame, there is no abnormal tendency for the wheel to bounce as the machine moves along. Also, I have found that braking the rear wheel does not affect the functioning of my improved suspension arrangement, and that the rubber discs at the front of the inner frame are entirely adquate to transmit the torque due to braking to the main frame of the vehicle. A further advantage of my improved rear spring support and shock absorbing unit is the fact that the friction blocks hold the member 38 substantially horizontal. Since the arms 39 and 41 are rigidly secured to the member 38 twisting of the rear end of the frame is substantially eliminated without interfering with the spring action of the assembly.

While I have shown my invention in but two forms it will be obvious to those skilled in art that it is not so limited but is susceptible of various other changes and modifications, without departing from the spirit thereof, and I, desire, therefore, that only such limitations shall be placed thereupon as specifically set forth in the appended claims.

What I claim is:

1. In a motorcycle, a main frame, an auxiliary frame pivotally connected adjacent its forward end to the main frame, a driving motor and wheel carried by the auxiliary frame, spring suspension means comprising a block of rubber non-rotatably mounted adjacent the rear end of the main frame, a member passing through the rubber block and secured thereto, said member projecting past the ends of the rubber block, arms secured to the projecting ends of said member and pivotally connected to the auxiliary frame adjacent the rear end thereof, and a block of friction material pressed into engagement with the member and resisting rotation thereof responsive to downward movement of the auxiliary frame relative to the main frame, said member engaging the friction block with reduced pressure upon upward movement of the auxiliary frame relative to the main frame.

2. In a motorcycle, a main frame having side members and a portion connecting the side members at the rear, an auxiliary frame disposed inside the main frame, means resiliently and pivotally connecting the forward portion of the auxiliary frame to the main frame, a driving motor mounted on the auxiliary frame at a point rearwardly of the resilient connecting means, a driving wheel connected to the auxiliary frame at a point forwardly of the rear end of said auxiliary frame and rearwardly of the motor, resilient spring suspension means mounted adjacent the rear end of the main frame, downwardly biased forwardly extending arms connected to the spring suspension means and pivotally connected to and bearing on the auxiliary frame at a point rearwardly of the point of connection of the rear wheel to said auxiliary frame, and means connecting the motor in driving relation to said wheel.

3. A motorcycle as defined in claim 2 in which the auxiliary frame embodies a single continuously extending rearwardly disposed side member having a rearwardly disposed U-shaped section partially encircling the rear portion of the driving wheel and disposed laterally away from said side member, thereby defining an opening along one side of the auxiliary frame through which said wheel may be removed, and a stud axle secured to said side member and projecting inwardly of the auxiliary frame on which said wheel is mounted.

4. In a motorcycle, a main load carrying frame comprising side members joined at the rear by a cross member, an auxiliary frame comprising at least one side member and a rear portion, means adjacent the front of the auxiliary frame pivotally and resiliently connecting the auxiliary frame to the main frame, a wheel mounted on the auxiliary frame, a driving motor mounted on the auxiliary frame forwardly of the wheel and operatively connected in driving relation to the wheel, a pair of forwardly extending arms pivotally carried by the cross member of the main frame and having their forward ends pivotally connected to the auxiliary frame adjacent its rear end and rearwardly of the point of mounting said wheel, a rider carrying body on the main frame positioned thereon to impose at least some of the weight of the rider on the rear end of the main frame, and spring means biasing the forward ends of said arms toward the auxiliary frame with a force to substantially balance the tendency of said auxiliary frame to pivot about the wheel when the rider is seated on the body.

5. In a motorcycle embodying an outer main frame and an inner auxiliary frame carrying a driving motor and a driving wheel driven by the motor and mounted on the auxiliary frame rearwardly of the motor, the improvements which comprise thin walled vertically disposed members of resilient material carried by the auxiliary frame near the forward end thereof, a member passing transversely through said resilient members and secured to opposite sides of the main frame, a block of rubber non-rotatably mounted on the rear end of the main frame, a horizontally disposed rod secured in the block of rubber and extending transversely of the main frame, forwardly extending arms secured to each end of the rod and having their forward ends pivotally connected to the auxiliary frame rearwardly of the wheel, and a rider carrying body mounted on the main frame and imposing at least a part of the rider's weight on the rear end of the main frame, said arms being under sufficient downward tension to substantially balance the auxiliary frame against pivotal movement in a vertical plane about the wheel when the rider's weight is carried by the body.

6. For use as a suspension spring and shock absorbing unit for vehicles having a main frame and a wheel carrying frame, a block of rubber adapted to be non-rotatably secured to one of said frames, a rod passing centrally through the block of rubber and secured thereto, said rod projecting past the ends of the block of rubber, blocks of friction material adapted to be secured to the frame carrying the block of rubber and frictionally engaged by the ends of said rod, and arms on the projecting portions of said rod engaging the other of said frames and resiliently supporting the adjacent portions of the frames for movement relative to each other.

7. For use as a suspension spring and shock absorbing unit for vehicles having a main frame and wheel carrying frame, a cylinder of rubber vulcanized in a cylindrical metallic housing, a tubular sleeve non-rotatably secured to one of said frames and telescopically receiving the housing, locking means holding the housing in selected angular position in the sleeve, a rod passing centrally through the block of rubber and secured thereto, said rod projecting past the ends of the block of rubber, blocks of friction material adapted to be secured to the frame carrying the block of rubber and frictionally engaging the projecting ends of said rod, and arms on the projecting portions of said rod engaging the other of said frames and resiliently supporting the adjacent portions of the frames for movement relative to each other.

8. In a motorcycle embodying an outer main frame and an inner auxiliary frame carrying a driving motor and a driving wheel driven by the motor and mounted on the auxiliary frame rearwardly of the motor, the improvements which comprise members of resilient material carried by the auxiliary frame near the forward end thereof, a member passing through said resilient members and secured to the main frame, a block of rubber non-rotatably mounted on the rear end of the main frame, a horizontally disposed rod secured in the block of rubber and extending transversely of the main frame, forwardly extending arms secured to each end of the rod and having their forward ends engaging on top of the auxiliary frame rearwardly of the wheel, blocks of friction material secured to the main frame adjacent either end of said block of rubber and in contact with said rod, said rod being movable slightly away from said blocks of friction material upon upward movement of the rear end of the auxiliary frame relative to the rear end of the main frame, and a rider carrying body mounted on the main frame and imposing at least a part of the rider's weight on the rear end of the main frame, said arms being under sufficient downward tension to substantially balance the auxiliary frame against pivotal movement in a vertical plane about the wheel when the rider's weight is carried by the body.

PORTER LANDRUM.

References Cited in the file of this patent

UNITED STATES PATENTS

| Number | Name | Date |
| --- | --- | --- |
| 1,101,435 | Hedstrom et al. | June 23, 1914 |
| 1,485,935 | MacLean | Mar. 24, 1924 |
| 1,651,281 | Kline | Nov. 29, 1927 |
| 2,122,656 | Paget | July 5, 1938 |
| 2,243,124 | Rockola | May 27, 1941 |
| 2,275,050 | Lewis | Mar. 3, 1942 |
| 2,522,867 | Goldammer | Sept. 19, 1950 |
| 2,537,679 | Kraeft | Jan. 9, 1951 |